June 27, 1939.   E. J. LATTNER   2,163,910
HEATING AND CONTROL MEANS
Filed Dec. 28, 1936

INVENTOR.
EMERT J. LATTNER
BY
Flournoy Corey
ATTORNEY.

Patented June 27, 1939

2,163,910

UNITED STATES PATENT OFFICE 2,163,910

HEATING AND CONTROL MEANS

Emert J. Lattner, Cedar Rapids, Iowa

Application December 28, 1936, Serial No. 117,815

11 Claims. (Cl. 237—19)

This invention relates to combined heating and control means and has particular relation to means for furnishing heated air to a building or the like and for maintaining a supply of hot water.

It is, of course, well known to the art to heat air or water by means of a furnace and to furnish heat to the furnace by means of an oil burner, gas burner, coal stoker or the like, one of the major advantages of such devices being that the quantity of heat may be controlled or varied in accordance with the demand. It is also well known to place a loop of a hot water supply system in the furnace in such manner that the water passing through the loop is heated and to conduct this heated water to a supply tank and store it there until used.

It is apparent, however, that the heating of water in this manner can be accomplished only in the winter months when the heating plant is in operation for heating the building or other enclosure and during the summer months it is necessary to heat the water by some other means.

I have observed the difficulties and shortcomings beforementioned and have devised a new and improved system whereby the same heater may be used both for furnishing heat to a building or for like uses and for heating water as well. Water may be heated, in accordance with demand, without furnishing heat to the building, thus permitting the use of a common heating plant without change in the heating system for heating water at times, as for instance in the summer months, when heat is not desired in the building.

It is accordingly an object of my invention to provide means whereby the same furnace may be employed for heating a building in the winter and to provide hot water winter and summer without heating the building during the summer months.

It is another object of my invention to provide, in a connection with a furnace, means whereby the furnace may be utilized at one time for furnishing hot water only and at other times for furnishing hot water and heat for the building as well.

Another object of my invention is to provide a new and improved control system for controlling a furnace and for controlling a hot water supply means.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claims, without departing from the spirit of the invention.

Figure 1:
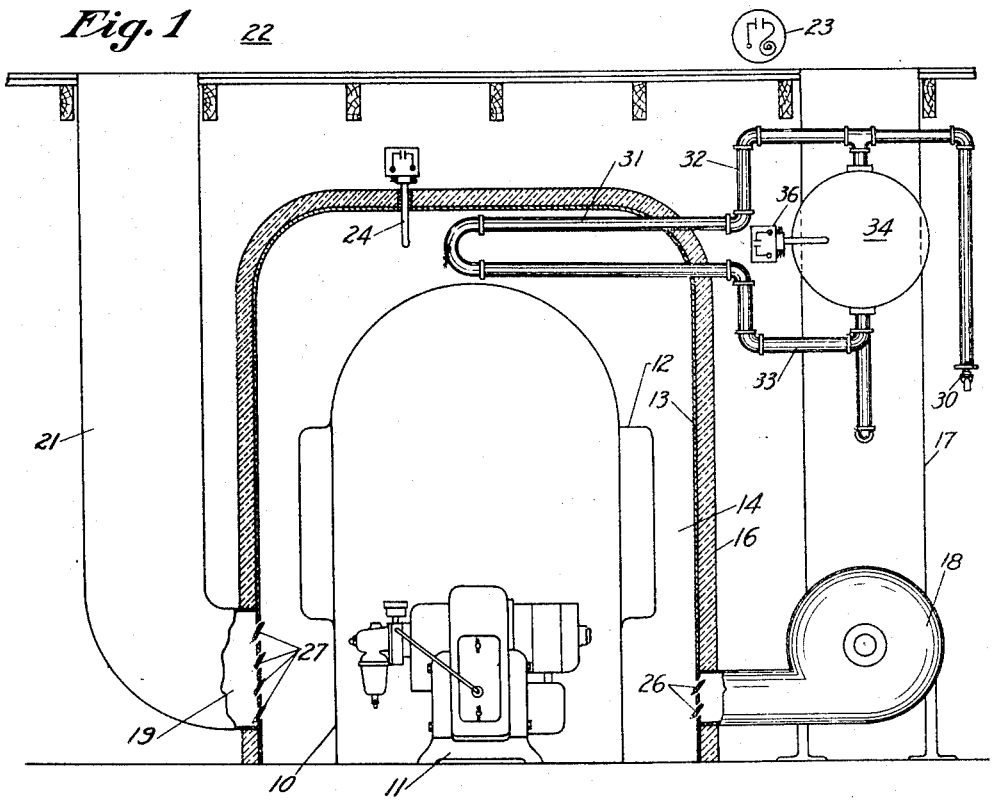
Figure 2:
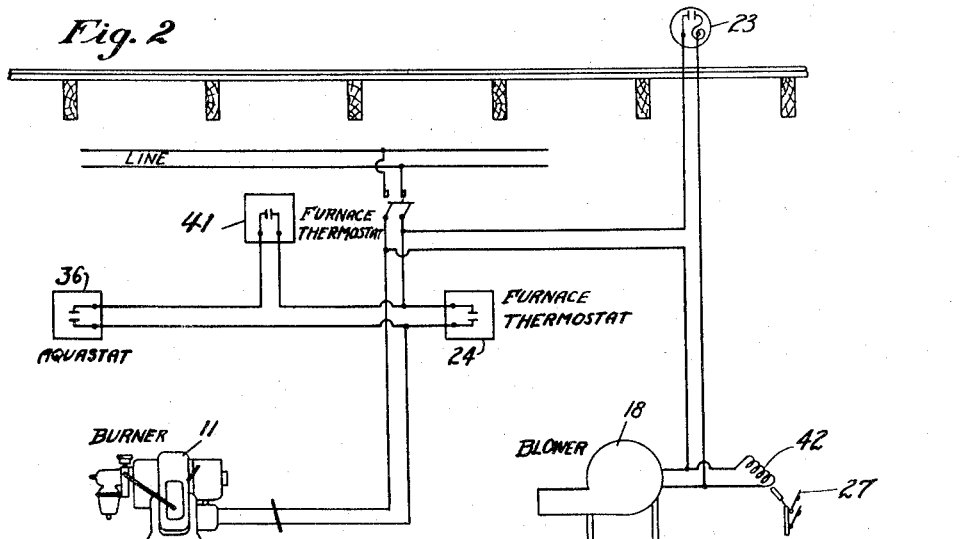

In said drawing:

Figure 1 is a diagrammatic representation of a house heating means and water heating means and control system constructed according to one embodiment of my invention, and Figure 2 is a schematic diagram of the control system for the system shown in Figure 1.

Referring now more particularly to Figure 1, I have illustrated a furnace 10 and means of furnishing heat to the furnace, indicated at 11. This latter may be an oil burner, a gas burner, a coal stoker, or any means of furnishing heat which is adapted to be controlled so that it may be regulated in accordance with the demand for heat. The furnace may be equipped with additional radiating means such as the conduits indicated at 12. The furnace is surrounded by an air tight casing 13 to thus define an open space 14 between the furnace and the casing which, of course, will be heated when the furnace is heated. The casing 13 is preferably surrounded by an insulating cover 16 which may be of any suitable material, as for instance rock wool or the like, to prevent the heat from the furnace from passing into the basement or other room in which the furnace is located.

In installing a furnace in accordance with my invention, I preferably provide an intake conduit such as the cold air intake indicated at 17 which intake leads from the house or other enclosed space to be heated in accordance with the usual practice. I then provide a blower 18 at the side of the furnace and connect the intake conduit 17 with the intake of this blower. The air passing through the blower is driven into the chamber 14 between the furnace 10 and the casing 13, passes around and/or over the furnace, out through an outlet opening 19, and through the hot air conduit into the room or other enclosure indicated at 22.

The blower 18 is adapted to be controlled by means of a thermostat 23 in the room or other enclosure. This thermostat is preferably so constructed that it is closed when the temperature of the room is below the desired temperature as for instance 70° and as long as the temperature of the room is below 70° the blower will rotate to force air through the furnace and heating system.

I provide another temperature control or furnace thermostat 24 within the jacket 13, preferably at the highest point in the heating space 14, and this temperature control is preferably so constructed that it is closed at temperatures below say 200°. The furnace thermostat 24 is connected to the burner or other heating means 11 and controls its operation. For instance, in connection with an oil burner, this control would control the blower, pump and ignition device. In a coal stoker it would be used to move the grates of the stoker or operate the other fuel feeding means, while in a gas burner it would be used to open the control valve for furnishing fuel to the burner. If the temperature within the casing 13 becomes less than 200° the heating device 11 is placed in operation to heat the air within the space 14.

Cooling of the chamber in casing 13 may occur in any one or more of three ways: by natural radiation; by the blast of air from the blower; or by cold water passing through the pipe coil 31. It is the purpose of the thermostat 24 to keep the temperature of the chamber 14 up to a certain value at all times. In this way a comparatively large value of residual heat is stored in the furnace at all times and as soon as a call for heat is made, the residual heat is instantly available. If the demand for heat continues the heater goes into operation. Heat is thus furnished instantaneously as soon as called for and maintained as long as it is desired.

I furnish, in addition to the room thermostat 23 and furnace thermostat 24, an aquastat 36 located within the water tank 34, as hereinafter described, and this aquastat may be electrically connected to the burner 11 to energize it to furnish heat if the temperature of the water in the tank falls below a predetermined value.

In order to confine the air within the casing 13, if the blower 18 is not in operation, I provide an air flow control means such as louvers 26 and 27 at the inlet and outlet of the casing. These louvers are so constructed that air passing through the inlet and outlet will blow open the louvers, but if air is not being forced through the inlet and outlet, the louvers are closed by gravity to thus close off the space 14. The louvers can be opened or closed by mechanical means or motor driven devices known to the art which may be energized or actuated by the blower or the means energizing the blower. An electro-magnetic device for this purpose is illustrated diagrammatically at 42.

In operation, if the room thermostat 23 calls for heat, a circuit leading to the blower is closed and the blower is energized to draw air in through the cold air or intake pipe 17 and drive it through the louvers 26, thus driving the heated air within the chamber 14 out through the louvers 27 and the hot air conduit 21. The cold air entering the furnace is heated by passing through the chamber 14 and driven out through the hot air conduit to heat the room 22 until the temperature is above 70° and the thermostat 23 opens. As soon as the cold air from the blower 18 strikes the furnace thermostat 24 and lowers its temperature below 200 degrees, or other predetermined value, the thermostat is closed to close a circuit leading to the burner 11, to set the burner in operation. The burner continues in operation until the temperature within the chamber 14 again reaches 200°, which occurs because the room thermostat 23 is satisfied or because sufficient residual heat has been built up in the furnace to hold it above 200° for a period of time.

As has been previously pointed out, the temperature of the thermostat 24 may be lowered in another manner, by cold water passing through the pipe coil 31, as for instance withdrawing water from the hot water faucet 30. The temperature of the chamber 14 is thus lowered, the furnace thermostat 24 is closed and a circuit including the burner 11 is closed to actuate the burner to heat the furnace and the water passing through the coil. Since the circuit through the furnace thermostat 24 does not include the blower 18, the louvers 26 and 27 remain closed and no heat passes into the room 22.

An arrangement is provided by the use of the aquastat 36 in the water tank 34, which makes the system particularly quick to act to heat other water as soon as water is withdrawn from the supply tank. This aquastat may be used as a parallel control with the furnace thermostat 24 to cause the burner 11 to be placed in operation. The use of the aquastat 36 has the advantage that the furnace is placed in operation to heat the water as soon as cool water enters the tank 34. Thus the temperature of the water from the faucet 30 is more readily controlled and will remain more nearly at the desired value. In using the aquastat 36 it is desirable to use a second furnace thermostat set at a slightly higher temperature than the setting of thermostat 24, say 210°, so that if the furnace temperature becomes higher than desirable, leading to overheating, this second thermostat, which is really an upper limit thermostat, will be opened to break the circuit leading to the oil burner 11. The aquastat control may be eliminated if desired.

There are several circuits and sets of instruments which may be employed for securing operation of a hot air furnace and hot water system in this manner, one of such circuits being shown in Figure 2. The furnace thermostat 24 is placed in series relation with the burner while the room thermostat 23 is placed in series relation with the blower. If it is desired to employ an aquastat at the tank, the aquastat and furnace thermostat are employed in parallel relation with each other and in series relation with the burner. Closing of the furnace thermostat in this latter circuit will actuate the burner or closing of the aquastat will actuate the burner. In order to prevent the furnace from overheating, however, as has been pointed out, it is necessary to employ a second furnace switch, illustrated diagrammatically at 41, and this is in series with the aquastat so as to render the aquastat inoperative to close the burner circuit in the event that the furnace becomes too hot.

An electrical circuit may be employed in parallel relation with the blower, as illustrated at 42, for actuating a solenoid or motor driven mechanism for opening the louvers 26 and 27 when the circuit is energized and closing them or permitting them to be closed when the circuit is de-energized.

It is apparent that I have provided means for furnishing heat and or hot water at any time, each in accordance with the demand, that is the means for furnishing hot water may be operated without or at the same time heat is being furnished. The plant heating apparatus is used winter and summer without changing the structure, and without a change in control means, and the system may be utilized in connection with gas burners, fluid fuel burners, coal stokers or even with the ordinary hand fired furnace equipped with draft controls.

It is apparent that modifications of my invention may be made by those skilled in the art. Such modifications may be made without departing from the spirit and scope of my invention as set forth in the appended claims.

I claim as my invention:

1. A combined hot air heating plant and hot water heating means including a burner for furnishing heat to the furnace, a blower for driving air through the furnace, a room thermostat in series electrical relation with the blower for energizing it in accordance with the demand for heating the building, a furnace thermostat connected in series electric relation with the burner and adapted to maintain the furnace at a predetermined temperature, a hot water coil in the furnace, and means associated with the blower for closing off the furnace when the blower is not in operation, and an aquastat in the hot water system electrically connected in parallel connection with the furnace thermostat, and an upper limit furnace thermostat connected in series relation with the aquastat.

2. In a heating system, a furnace, a heat source, a casing surrounding the furnace, the casing having intake and exhaust openings, movable louvers in the openings for normally closing them but adapted to open under pressure of the air from a blower, a blower connected to the intake opening, a hot water coil extending into the chamber between the furnace and casing, a thermostat connected with the interior of said chamber and adapted to energize and de-energize the heat source for maintaining the chamber at a predetermined temperature, a room thermostat adapted to energize and de-energize the blower, and an aquastat controlled by the temperature of the water in the water coil also adapted to energize and de-energize the heat source.

3. In a heating system, a hot air furnace, comprising the furnace fire chamber with radiator and an outer casing, means for maintaining the outer chamber of the furnace at a point above a predetermined temperature, a means for preventing heat loss through the outer casing of the furnace, intake and exhaust openings to and from the furnace, a room thermostat, and a blower connected to the intake opening of the furnace, the same being controlled by the room thermostat, the intake and exhaust openings of the furnace being arranged near the bottom of the outer casing so as to trap the heat in the upper portion of the casing, except when the blower is in operation, the furnace fire chamber and the casing arranged so that the air from the blower is forced up and over the furnace fire chamber removing the trapped heated air and forcing the same out of the exhaust opening of the furnace casing.

4. In a combined hot air heating plant and hot water heating means including a furnace, a burner for furnishing heat to the furnace, a low limit control connected to the burner and placed within the furnace so as to maintain a constant temperature in the bonnet of the furnace, cold and warm air ducts connected to the furnace casing at the lower portion thereof, a blower connected in one of these ducts, a room thermostat to control the blower, and a means to prevent movement of air through the duct when the blower is idle, the furnace being arranged so that the upper portion thereof comprises a storage chamber in which heated air is trapped when the blower is inoperative.

5. In a combined hot air heating plant and hot water heating means including a furnace, a burner for furnishing heat to the furnace, a low limit control connected to the burner and placed within the furnace so as to maintain a constant temperature in the bonnet of the furnace, insulation material applied about the outer casing of the furnace to prevent heat loss therefrom, cold and warm air ducts connected to the furnace, a blower connected in one of these ducts, a room thermostat to control the blower, a means to prevent movement of air through the duct when the blower is idle, the furnace being arranged so that the heated air is trapped in its upper portion when the blower is inoperative, and a water heating coil in the upper portion of the storage chamber of the furnace.

6. In a heating system, a furnace, an insulated casing surrounding the furnace and having openings only at the bottom portion thereof for inlet and exhaust conduits so as to trap heated air in the upper portion of the casing, a blower in one of the conduits to circulate air through the casing so as to remove the trapped heated air therefrom, a burner for supplying heat to the furnace, a thermostatic means responsive to the heat in the casing to control the operation of the burner to maintain the trapped air at a predetermined temperature, a room thermostat to control the operation of the blower, and a water heating coil positioned in said casing so as to be enveloped by said trapped heated air.

7. In a heating system, a casing closed at the upper portion thereof to form a chamber for trapping heat therein to thus provide a heat reservoir, a furnace and thermostatic means actuated by changes in temperature in the heating reservoir for maintaining the temperature and thus the quantity of heat in the reservoir at a certain predetermined value, inlet and outlet ducts forming a part of an otherwise conventional hot air heating system connected to the lower portion of the casing, a hot water pipe passing through the heat reservoir, means for causing a flow of water through the hot water pipe, and means for causing a flow of air through the inlet duct, the heat reservoir and the outlet duct, whereby both air and water issuing from the furnace casing and heat reservoir are hot at once without the necessity of waiting for incoming air and water to be heated and withdrawn.

8. In a heating system, a casing closed at the upper portion thereof to form a chamber for trapping heat therein to thus provide a heat reservoir, inlet and outlet ducts connected to the lower portion of the casing and forming a portion of an otherwise conventional space heating system, means normally substantially closing the inlet and outlet ducts, a hot water pipe in the upper portion of the interior of the casing, a furnace for supplying heat to the reservoir, means for energizing the furnace for supplying additional heat to the heat reservoir when the heat stored within the heat reservoir decreases below a predetermined value, and means for forcing air into the inlet duct, through the interior of the casing, and out through the outlet duct when heat is needed for the space heating system.

9. In a heating system, a casing closed at the upper portion thereof to form a chamber for trapping heat therein to thus provide a heat reservoir, ducts connected to the lower portion of the casing, said ducts forming a portion of an otherwise conventional space heating system, a furnace for supplying heat to the heat reservoir, means for causing and controlling a flow of air through the ducts and the interior of the casing and the heat reservoir thereof to utilize the heat stored in the heat reservoir for heating space, a hot water pipe leading through the heat reservoir, means responsive to a drop in temperature of the hot water for actuating and energizing the furnace to supply heat to the heat reservoir, and other means responsive to a drop in temperature of the space being heated to cause a flow of air through the ducts and the heat reservoir to thereby provide a flow of hot air and hot water as soon as flow of either starts.

10. In a combined hot air heating plant and hot water heating means including a furnace, a burner for furnishing heat to the furnace, the bonnet of the furnace being closed to provide a heat reservoir, inlet and outlet air ducts constituting a part of an otherwise conventional air heating system, connected to the bonnet at the lower portion thereof, a blower connected to one of the ducts, a room thermostat to control the blower, a means to prevent movement of air through the ducts when the blower is idle, and a means whereby a low limit control controls the burner to maintain a constant temperature in the bonnet of the furnace and replenish any heat loss resulting from radiation or use of the stored heat, the room thermostat being electrically connected to the blower to energize the blower when heat is needed, whereby, when the blower is energized, cold air is circulated through the bonnet and the stored hot air is forced out through the outlet duct and into the room.

11. In a heating system, a heating unit comprising a casing, a means for preventing heat loss from the casing, a source of heat within the casing, a means for controlling the source of heat to maintain air within the casing at a constant temperature, inlet and outlet ducts and connections to the casing at the lower portion thereof, a blower in one of the ducts, a means for controlling the operation of the blower in accordance with the demands for heat in the rooms to which the ducts are connected, and movable louvers in at least one of the ducts to be operated in conjunction with the blower so as to trap the heated air in the upper portion of the casing when the blower is not in operation.

EMERT J. LATTNER.